Jan. 22, 1946.  T. BAILEY  2,393,453
FLOUR SIFTER
Filed March 4, 1944  2 Sheets-Sheet 1
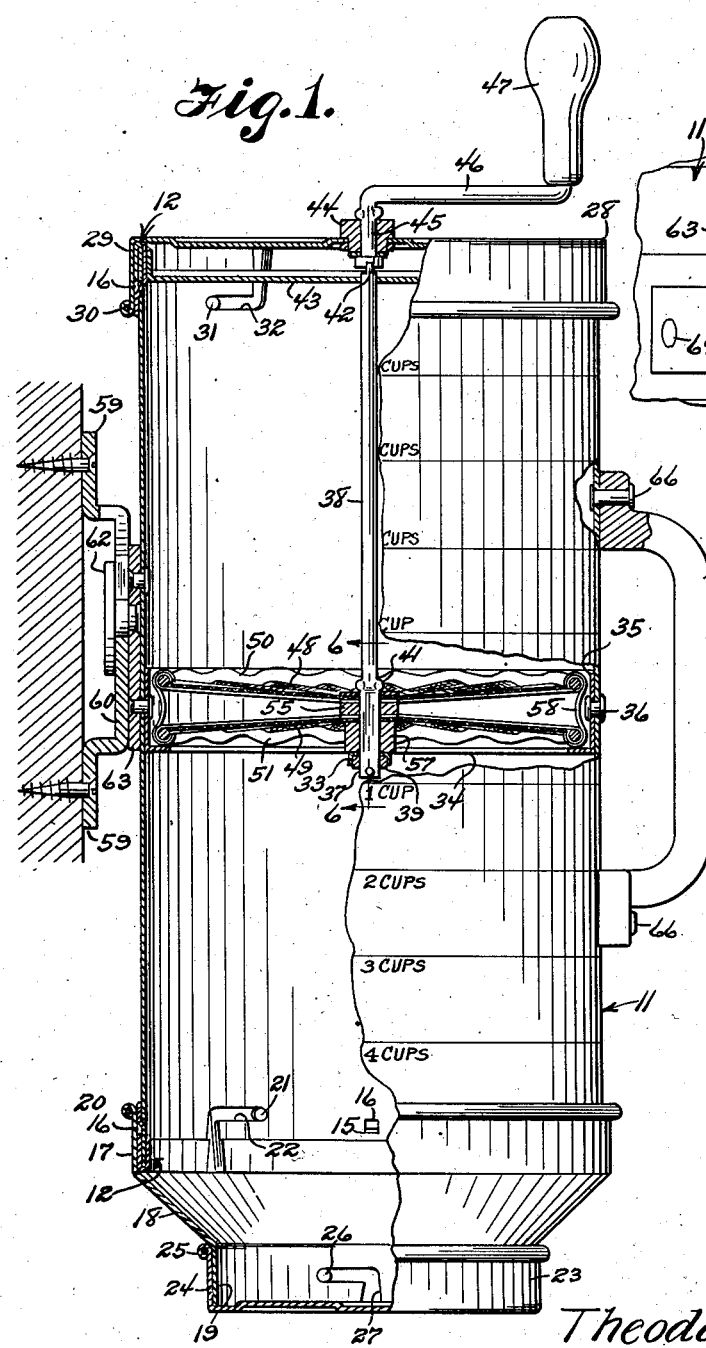
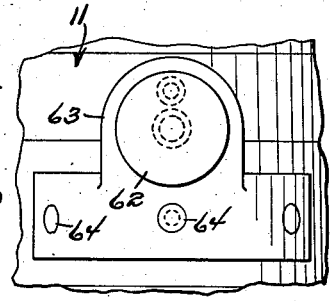
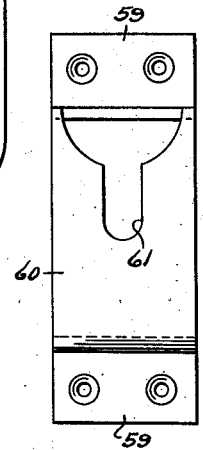
INVENTOR.
Theodore Bailey
BY
Victor J. Evans & Co.
ATTORNEYS Jan. 22, 1946. T. BAILEY 2,393,453
FLOUR SIFTER
Filed March 4, 1944 2 Sheets-Sheet 2
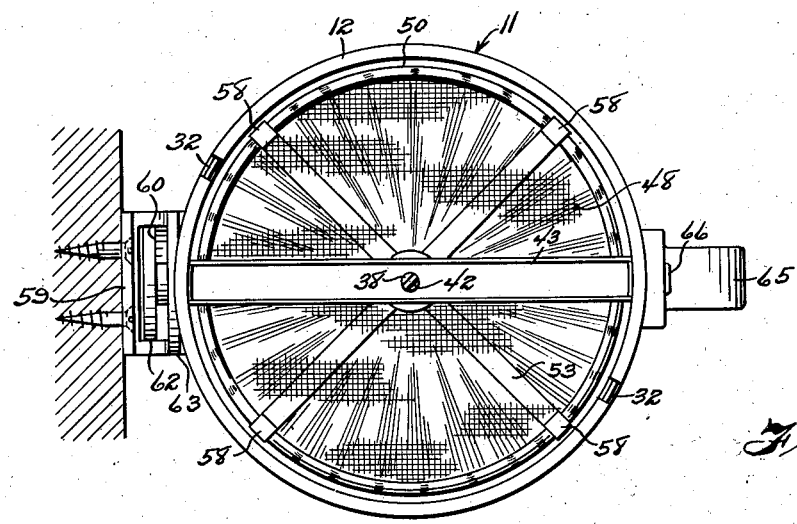
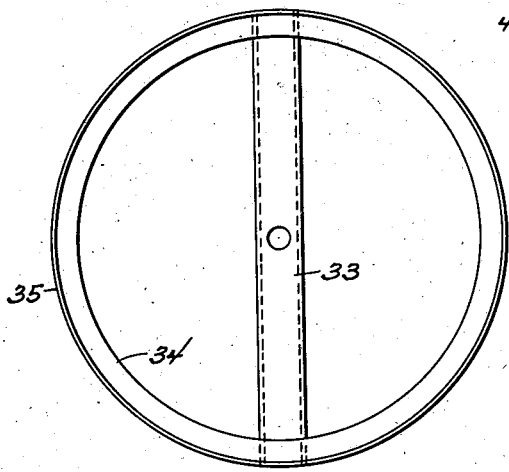
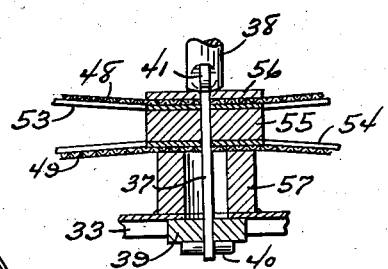
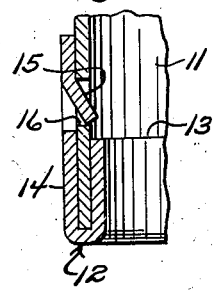
Theodore Bailey INVENTOR.
BY
Victor J. Evans & Co.
ATTORNEYS Patented Jan. 22, 1946

2,393,453

UNITED STATES PATENT OFFICE 2,393,453

FLOUR SIFTER

Theodore Bailey, Habana, Cuba

Application March 4, 1944, Serial No. 525,073

5 Claims. (Cl. 209—251)

This invention appertains to new and useful improvements in flour sifters of the type disclosed in my prior Letters Patent of the United States, No. 2,204,920, issued June 12, 1940, and has for one of its several objects to introduce certain refinements in structure and arrangement of parts deemed necessary to meet the ever-growing demand for simplification in construction, increased efficiency, and lower cost to manufacture.

Another object of the invention is to provide a sifter body with two chambers or compartments, separated by the sifting mechanism, so that a supply of flour may be screened a number of times between the chambers or compartments for the purpose of producing a lighter and fluffier flour for the making of better breads, cakes and pastries.

Another object of the invention has to do with the provision of an improved and more simplified sifting mechanism which efficiently speeds up the sifting operation and, at the same time, is effective in breaking down the flour to the desired light and fluffy state.

With these and other objects and advantages in view, the invention resides in the certain new and useful combination, construction and arrangement of parts, as will be hereinafter more fully described, set forth in the appended claims, and illustrated in the accompanying drawings, in which:

Figure 1 is a side elevation, partly in section, of the improved sifter, in accordance with the invention;

Figure 2 is a fragment of the side wall of the sifter body and showing the attached portion of the supporting means;

Figure 3 is a face view of the supporting bracket to be engaged by the attached portion on the sifter body;

Figure 4 is a top plan view of the sifter and its supporting bracket, the closure for the open end of the sifter body being removed;

Figure 5 is a top plan view of the inner of the cross-bar supports for the sifter mechanism;

Figure 6 is an enlarged sectional detail taken on the line 6—6 of Figure 1; and, Figure 7 is an enlarged sectional detail of an open end portion of the sifter body and showing a reinforcing means therefor, particularly when the body is made of a plastic.

Referring to the drawings, wherein like characters of reference denote corresponding parts in the several views, the embodiment of the invention, as it is exemplified therein, is generally comprised in an open ended receptacle or drum and a sifting means centered within the same to divide its interior into two end compartments, one of which has its open end provided with a normally closed discharge outlet and the other its open end closed by a detachable cover in which a hand-crank is mounted for coupling to the operating shaft of the sifting means. The receptacle is side bracketed to a wall or other support for end-for-end turning movements for the purpose of sifting a quantity of flour from one compartment to the other a required number of times to reduce the flour to a desired degree of fineness, necessary to the making of light and fluffy breads, cakes and pastries. A handle is provided on the side of the receptacle, opposite its supporting bracket, to facilitate its end-for-end turning movements. When the sifting is completed, the flour should have been last sifted from the upper compartment into the lower compartment for its delivery from the discharge outlet of the latter.

Specifically, the receptacle is indicated at 11 and it may be formed of any suitable material, such as a plastic, metal, or laminated wood, but, for the purpose of the present description, it will be assumed to be made of a plastic and, preferably, one that is transparent in character. As before stated, the ends of the receptacle 11 are open, and these ends will each be provided with a metal reinforcement 12. As shown in Figures 1 and 7, the reinforcements are identical in structure, each being of annular form and U-shaped in cross section to provide inner and outer flanges 13 and 14, for snug fitting engagement over the edge of an open end. Each reinforcement 12 is permanently secured in place by tongues 15 struck inwardly from the outer flange 14 and into engagement with complemental apertures 16 formed in the wall of the receptacle 11, inwardly of the edge of the inner flange 13, which is of a lesser width than that of the outer flange 14.

A discharge fitting, preferably of a reducer type, is detachably engaged over the reinforcement 12 at the lower end of the receptacle 11, and it is comprised by a hollow, frusto-conical, portion 18, which has annular flanges 17 and 19 respectively encircling its upper and lower ends, the upper flange 17 being engaged over the outer flange 14, of the reinforcement, and having its edge provided with a wire enclosed bead 20 for its own reinforcement. The upper flange 17 is also provided at its inner side with several equidistantly spaced studs 21 which are adapted for engagement with complemental bayonet slots 22, formed in the outer flange 14 of the reinforcement 12, to retain the reducer fitting in place. A detachable closure 23 is provided for the lower end of the reducer fitting 18, and it has an annular flange 24 for engagement over the lower flange 19 of the fitting, with its edge reinforced with a wire enclosed bead 25 and its inner side provided with several equidistantly spaced studs 26 for engagement with complemental bayonet slots 27 formed in the lower flange 19. The other, i. e., normally upper, open end of the body 11 is provided with a detachable closure 28 that has an annular flange 29 to engage over the outer flange 14 of the reinforcement 12, and its edge reinforced by a wire enclosed bead 30. The inner side of the flange 29 is provided with several equidistantly spaced studs 31 for engagement with complemental bayonet slots 32 formed in the outer flange 14 of the reinforcement 12.

Mounted within the body or receptacle 11 as thus constructed, and centered therein with respect to the ends of the same, is a sifting means that is supported on a channeled cross-bar or beam 33, which is supported from a flange 34 inturned from the lower edge of an annular metal band 35 that is secured by rivets or the like 36 to the wall of the receptacle. The cross-bar 33 has its ends secured to the flange 34, at diametrically opposite points thereon, in any suitable manner, as by being soldered or riveted thereto, and is provided with a circular opening at its center for the projection downwardly therethrough of the lower flattened end portion 37 of a shaft 38. The projecting end of the flattened portion 37 passes through a washer 39, that seats within the channel in the lower side of the cross-bar 33, and carries a cross-pin 40 immediately below the washer. The shaft 38 is shouldered, as at 41, at the connected end of the flattened portion 37, and is of circular cross-section for the remainder of its length, except that its extreme upper end is also flattened to form a coupling element 42. The outer end of the shaft 38, immediately below the coupling element 42, is journalled in a cross-bar 43 that has its ends secured, as by soldering, to the inner flange 13 of the reinforcement 12. Mounted centrally in the end wall of the closure 28 is a bearing element 44 for the inner crank end portion 45, of a hand-crank 46, the inner end of the crank portion 45 being cross-slotted for engagement with the coupling element 42, of the shaft 38, when the closure 28 is placed in position on the receptacle. A handgrip 47 is loosely mounted on the outer crank end portion of the hand crank 46 to facilitate its manipulation for imparting a turning motion to the shaft.

Engaged on the flattened portion 37, of the shaft 38, is a double sifting member that is comprised in two wire mesh discs 48 and 49 which are reinforced at their respective edges by annular metal members 50 and 51, that may be formed of a heavy gauge wire, which are preferably undulatory; i. e., wave form; to corrugate the discs radially from their centers, so as to additionally agitate the flour in its passage from one compartment to the other. The discs 48, 49, are supported at their inner sides by spiders 53 and 54, respectively, which are mounted at their centers on the flattened lower end portion 37 of the shaft 38, together with an interposed spacer disc 55, against the upper and lower ends of which the spiders and their associated screen discs are respectively clamped by annular members 56 and 57, the lower of which is supported on the cross-bar 33. The annular member 57 is stationary on the cross-bar 33 and forms a bearing for the sifting means, including the spacer disc 55 and the annular member 56, which is rotated, together with the washer 39, when the shaft 38 is turned. The radial arms of the spiders 53, 54, have their outer ends secured to the annular members 50 and 51, respectively, which are interconnected by a plurality of spacer elements 58 that are equidistantly spaced about the same and have their ends secured to the same, as by being soldered thereto. The length of these spacer members 58 is greater than the height or thickness of the spacer disc 58, so that the screen discs 48, 49, are oppositely dished, substantially as is shown in Figures 1 and 6.

To mount the receptacle 11 for its required end reversing movements, a wall bracket is provided in the form of a metal plate that has end securing portions 59 angularly offset from an intermediate parallel portion 60 which is slotted, as at 61, downwardly from its upper angled end to receive a headed gudgeon 62 projecting from a supporting plate 63 that is secured to the adjacent side of the receptacle. The supporting plate 63 is secured, as at 64, to the receptacle at a point intermediate its ends and slightly above its transverse center, so that the receptacle will, of its own volition, assume an upright position in the bracket, with its discharge outlet downwardly directed. For reversing the receptacle 11, and steadying it during the turning of the hand-crank 45, a handle 65 is secured, as by the rivets 66, to the side wall of the receptacle at a point thereon opposite the gudgeon supporting plate 63.

For the purpose of determining the quantity of flour placed within one or the other of the compartments, above and below the sifter unit, or for measuring an amount of the sifted flour from the same, the wall of the receptacle 11 is suitably marked with parallel, circumferentially extending, lines, which are spaced axially of the wall at intervals corresponding to cupfuls of flour and these lines will be numerically designed progressively from opposite sides of the sifter unit toward the ends of the receptacle.

In the operation of the device, the upper compartment of the receptacle 11 may be supplied with a quantity of flour to be sifted upon the removal of the closure 23, either with the receptacle supported from the bracket 60 or removed therefrom. With the replacing of the closure 28, the slot in the end of the inner portion 43, of the hand-crank 44, will be engaged with the coupling element 40 at the upper end of the shaft 38, when, by turning the hand-crank 44, the sifter unit will be rotated and the flour will pass downwardly through the screen discs 48, 49, into the lower compartment. During the sifting operation, the receptacle 11 will be steadied on the bracket by the operator grasping the handle 65. To re-sift the flour, the receptacle 11 will be inverted, by being turned on the gudgeon 62 to inverted position, when further manipulation of the hand-crank 44, the flour will pass through the screen discs 48, 49, and back into the upper compartment. By thus reversing the receptacle 11 for repeated sifting of the flour, the flour will be reduced to a desired light and fluffy condition, necessary to meet the present day demand for light breads, cakes and pastries. To extract a quantity of the sifted flour from the receptacle, the lower closure 26 is removed from the discharge outlet in the reducer fitting 18 for the down flow of the flour into a container held or positioned beneath the outlet.

Having thus fully described a preferred embodiment of my invention, it is to be understood that various changes in material, size, shape and arrangement of parts, may be resorted to, without departing from the spirit of the invention or its scope as claimed.

What I claim is:

1. A flour sifter comprising an elongated cylindrical body open at both ends, a pair of oppositely dished discs of wire mesh connected to form a sifter screen unit mounted centrally of the body to divide its interior into upper and lower compartments, undulatory reinforcements bounding the peripheries of the discs and corrugating the same radially inward toward their centers, spiders for supporting the discs in closely spaced relation and having the outer ends of their radial arms connecting the reinforcements, a shaft extending axially of the body toward the upper end and exteriorly of the body for rotating the sifter unit in which the spiders are mounted, removable closures for the open ends of the body and means for mounting the body for end-to-end reversing movements so that the flour can be repeatedly sifted from one compartment to the other and until it is reduced to a desired degree of fineness.

2. A flour sifter, comprising an elongated receptacle having a filling opening at one end and a dispensing opening at the other, closures for said openings, a pair of rotatably mounted relatively spaced mesh sifting members between the ends of the body, means for rotating the members, each member being corrugated and concave with the concave faces opposed to each other and facing the ends of the receptacle, said sifting members partitioning the receptacle into upper and lower compartments between which flour is adapted to be passed through said sifting members, and means movably mounting the receptacle to shift the flour.

3. A flour sifter, comprising an elongated receptacle having a filling opening at one end and a dispensing opening at the other, closures for said openings, a pair of rotatably mounted relatively spaced foraminated sifting members between the ends of the body, means detachably engaging the members for rotating the members, each member being corrugated and concave with the concave faces opposed to each other and facing the ends of the receptacle, undulatory edge reinforcements for said sifting members maintaining the corrugated concave formation thereof, a pair of spiders, one supporting the under face of each sifting member, and each spider connected to a reinforcing member, a spacer connecting the spiders at the center, spacers connecting the sifters at their edges, said sifting members partitioning the receptacle into upper and lower compartments between which flour is adapted to be passed through said sifting members, and means movably mounting the receptacle to shift the flour.

4. The invention as defined in claim 3 wherein the means for rotating the sifters includes a spacer having a flattened portion about which the sifters are mounted, wherein a rotative handle is carried by the closure for the filling opening and detachably engages the shaft, and wherein upper and lower clamping members are provided for holding the spiders against the spacer.

5. The invention as defined in claim 3 wherein the receptacle is hollow, and cylindrical, and the sifters are formed of wire mesh and are disk shaped and are supported by spiders clamped to a spacer at their central points, and wherein the edge spacers are longer than the combined thickness of the spider and the center spacer to preserve the concave shape of the disks.

THEODORE BAILEY.